(12) United States Patent
Stellmann

(10) Patent No.: US 8,925,433 B2
(45) Date of Patent: Jan. 6, 2015

(54) MACHINE TOOL MONITORING DEVICE

(75) Inventor: Georg Stellmann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 13/515,658

(22) PCT Filed: Oct. 25, 2010

(86) PCT No.: PCT/EP2010/066052
§ 371 (c)(1),
(2), (4) Date: Aug. 27, 2012

(87) PCT Pub. No.: WO2011/072924
PCT Pub. Date: Jun. 23, 2011

(65) Prior Publication Data
US 2012/0312137 A1 Dec. 13, 2012

(30) Foreign Application Priority Data
Dec. 17, 2009 (DE) .......................... 10 2009 054 911

(51) Int. Cl.
*B26D 7/27* (2006.01)

(52) U.S. Cl.
USPC .............. 83/56; 83/522.12; 83/477.1

(58) Field of Classification Search
USPC ............ 83/56, 58, 522.12, 477, 477.1, 477.2, 83/471; 340/870.09
See application file for complete search history.

(56) References Cited

U.S. PATENT DOCUMENTS

| | | | | |
|---|---|---|---|---|
| 2,944,120 A * | 7/1960 | Ruben | 200/5 R |
| 3,665,439 A * | 5/1972 | Brummer et al. | 340/870.07 |
| 4,249,074 A * | 2/1981 | Zettler et al. | 250/221 |
| 5,047,752 A * | 9/1991 | Schorn | 340/680 |
| 5,210,797 A * | 5/1993 | Usui et al. | 382/126 |
| 5,625,448 A * | 4/1997 | Ranalli et al. | 356/71 |
| 5,703,452 A | 12/1997 | Futsuhara | |
| 6,125,192 A * | 9/2000 | Bjorn et al. | 382/124 |
| 6,462,811 B1 * | 10/2002 | Turner et al. | 356/237.1 |
| 6,469,734 B1 * | 10/2002 | Nichani et al. | 348/152 |
| 6,506,558 B1 * | 1/2003 | Fodor et al. | 506/16 |
| 6,922,153 B2 * | 7/2005 | Pierga et al. | 340/686.5 |
| 7,525,055 B2 * | 4/2009 | Gass et al. | 200/50.37 |
| 7,739,934 B2 * | 6/2010 | Tetelbaum et al. | 83/58 |
| 7,849,034 B2 * | 12/2010 | Visel | 706/26 |
| 7,924,164 B1 * | 4/2011 | Staerzl | 340/573.1 |
| 8,122,798 B1 * | 2/2012 | Shafer et al. | 83/62.1 |
| 8,154,155 B2 * | 4/2012 | Seidel et al. | 307/326 |
| 8,489,223 B2 * | 7/2013 | Gass | 700/177 |

(Continued)

FOREIGN PATENT DOCUMENTS

DE    10 2008 002 431  A1   12/2008

OTHER PUBLICATIONS

International Search Report corresponding to PCT Application No. PCT/EP2010/066052, mailed Feb. 4, 2011 (German and English language document) (5 pages).

*Primary Examiner* — Sean Michalski

(74) *Attorney, Agent, or Firm* — Maginot, Moore & Beck, LLP

(57) ABSTRACT

A machine tool monitoring device includes a monitoring unit for monitoring a machine tool working region, which is provided in particular for detecting the presence of a material type, in particular human tissue, in the machine tool working region. The machine tool monitoring device further includes a safety unit which outputs at least one safety status signal depending on at least one parameter.

14 Claims, 3 Drawing Sheets

(56) References Cited

U.S. PATENT DOCUMENTS

| | | | |
|---|---|---|---|
| 2002/0000977 A1* | 1/2002 | Vranish | 345/173 |
| 2002/0059853 A1* | 5/2002 | Gass et al. | 83/62 |
| 2002/0069734 A1* | 6/2002 | Gass et al. | 83/13 |
| 2002/0170399 A1 | 11/2002 | Gass et al. | |
| 2002/0170400 A1* | 11/2002 | Gass | 83/62.1 |
| 2003/0117023 A1* | 6/2003 | Avril | 307/39 |
| 2004/0226800 A1* | 11/2004 | Pierga et al. | 192/129 R |
| 2009/0198465 A1* | 8/2009 | Decker et al. | 702/84 |
| 2012/0137848 A1* | 6/2012 | Gass et al. | 83/471.2 |
| 2013/0169571 A1* | 7/2013 | Gai et al. | 345/173 |
| 2014/0130645 A1* | 5/2014 | Takano et al. | 83/13 |

\* cited by examiner

MACHINE TOOL MONITORING DEVICE

This application is a 35 U.S.C. §371 National Stage Application of PCT/EP2010/066052, filed on Oct. 25, 2010, which claims the benefit of priority to Serial No. DE 10 2009 054 911.0, filed on Dec. 17, 2009 in Germany, the disclosures of which are incorporated herein by reference in their entirety.

BACKGROUND

Machine tool monitoring devices having a monitoring unit, specifically having a detection device, which is provided for the detection of the presence of a material type, specifically of human tissue, in a machine tool working region using spectral evaluation of radiation, are already known. The detection device has for this purpose a sensor unit with a sensitivity region for capturing radiation in a wavelength range which is situated at least partially in the infrared spectrum.

SUMMARY

The disclosure proceeds from a machine tool monitoring device having a monitoring unit for monitoring a machine tool working region, which is provided in particular for detecting the presence of a material type, in particular human tissue, in the machine tool working region.

It is proposed that the machine tool monitoring device has a safety unit which is provided for outputting at least one safety status signal depending on at least one parameter. A "machine tool working region" is intended to mean, in particular, any region of a machine tool located in the direct vicinity of a tool. A region located in the "direct" vicinity of the tool is intended to mean, in particular, a region in which every point in the region has a shortest distance from the tool, the distance being a maximum of 10 cm, preferably a maximum of 5 cm, and particularly preferably a maximum of 2 cm. In principle it is conceivable that the monitoring unit monitors, in addition to the machine tool working region, other regions, too. The monitoring unit is preferably provided for carrying out the material type, in particular human tissue, using spectral evaluation of radiation, wherein in particular the monitoring unit has at least one sensor unit having at least one sensitivity region for capturing radiation in a wavelength range which is situated at least partially in the infrared spectrum. "Radiation" in this context refers, in particular, to electromagnetic radiation. A "spectrum" of radiation captured by the sensor unit is intended to mean, in particular, a distribution of a radiation parameter, in particular the intensity of the radiation, as a function of the wavelength, frequency, and/or time. A "wavelength range" is intended to mean a spectral portion of the electromagnetic spectrum that is defined by specifying two characteristics. The "wavelength" of the wavelength range refers to its central wavelength, while the "bandwidth" of the wavelength range is its full-width at half maximum (FWHM). Furthermore, a "spectral evaluation" of radiation refers, in particular, to a signal evaluation in which an evaluation result is obtained by capturing and processing a characteristic of a spectrum of the radiation, in particular a signal intensity integrated over a wavelength range. Using the embodiment according to the disclosure, it is possible to reliably and rapidly detect an application situation of a machine tool in a low-cost manner. Moreover, "human tissue" refers, in particular, to a body part of an in particular non-covered human organism, such as skin, fingernails, and/or deeper tissue layers. With respect to a construction of the monitoring unit, in particular a detection device formed by the monitoring unit, reference can be made in particular to document DE 10 2008 002 431.7, the content of which, in particular with respect to the construction of the detection device, should be considered part of the disclosure of the present specification.

A "safety unit" in this context is intended to mean in particular a unit which is provided to increase the operational safety in a machine tool with a monitoring unit, specifically by the safety unit being provided for outputting at least one safety status signal depending on at least one parameter. In particular, the safety unit is provided for checking or diagnosing a function restriction of the monitoring unit and thus represents in particular a diagnostic unit. A "safety status signal" is intended here to mean in particular a signal, which has an information content regarding the extent to which the monitoring unit functions properly and/or can properly carry out in particular monitoring, in particular on the basis of available boundary parameters. The safety status signal can be formed by an information signal to an operator and/or a control signal to a machine tool unit. A "parameter" is intended to mean in particular in this context a parameter which differs from a parameter which is dependent exclusively on activation of the monitoring unit. Furthermore, "provided for" is intended to mean in particular especially equipped, adapted and/or programmed.

Preferably, the safety unit has at least one sensor unit which is provided for monitoring at least one actuation region of at least one actuation element. An "actuation region" is intended to mean here in particular an actuation surface area which is provided deliberately for being made contact with by an operator during actuation. An "actuation element" is intended to mean in particular an element which is provided in particular for being made direct contact with by an operator, such as in particular a manual action and/or particularly advantageously a switch actuation element which is actuated by an operator during initiation and/or the performance of a switching operation and is being made contact with in the process. It is possible using a corresponding sensor unit to capture a particularly expressive parameter, specifically in particular if the sensor unit is provided for detecting the presence of at least one material type, life detection and/or at least one fingerprint. If the sensor unit is provided for presence detection of human tissue, for life detection and/or for detecting at least one fingerprint, it is advantageously possible to conclude whether the operator operates with or without gloves and whether possibly, because of this, monitoring by the monitoring unit could be adversely affected. If the sensor unit is provided for capturing at least one fingerprint, it is additionally possible to reach a conclusion regarding a particular operator, as a result of which it is possible to release use of the machine tool only for a particular operator and/or for a particular group of operators. It is possible to avoid use by an unauthorized operator and for protection against theft to be achieved. Traces of a fingerprint are left behind independently of time as soon as smooth surfaces are directly touched by the fingers. In order to avoid copies of fingerprints it is known to carry out life detection, in which scanners capture particular features such as pulse, blood circulation, thermal image or a 3D-depth pattern. In the case of a fingerprint scanner and/or a life detection sensor, various methods are used such as infrared methods, capacitive methods, ultrasound methods etc., wherein a fingerprint is captured typically with a camera, such as in particular a CCD camera. The sensor unit for detecting the presence of a material type, in particular of human tissue, can be formed preferably from a sensor unit known from the application of a monitoring unit, as is known in particular from DE 10 2008 002 431.7.

The sensor unit can, for monitoring the actuation region of the actuation element or for capturing a parameter, dependent on which the safety status signal is output, be arranged, viewed in an operation position, laterally next to the actuation region and/or above the actuation region. Particularly advantageously, however, the sensor unit is arranged at least partially, viewed in an operation position, directly under an actuation surface area of the actuation element, as a result of which an exact parameter can be advantageously easily captured. Here, "directly under" is intended to mean in particular that in particular at least one straight line, which extends perpendicular to the actuation surface area and which intersects at least part of the sensor unit, exists.

In a further embodiment, it is proposed that the safety unit is provided for considering at least one parameter of a protection hood. A "parameter" of a protection hood is here intended to mean in particular a characteristic which contains an information content relating to a presence of a protection hood and/or advantageously relating to a position of a protection hood. On account of a corresponding consideration, it is advantageously possible to deduce a status relating to the extent to which the machine tool monitoring unit is restricted in its monitoring function.

Furthermore it is proposed that the safety unit has at least one confirmation operation element. A "confirmation operation element" is in particular meant here to indicate an element which is provided for being actuated by an operator in order to confirm at least a signal and/or state perceived by an operator, such as in particular a confirmation operation button, a confirmation operation rotary toggle, a confirmation operation toggle lever etc. Owing to a corresponding configuration, it is possible to ensure that specific signals are perceived by an operator. The confirmation operation element can be configured to be unipartite with an operation element which already has at least one function, such as unipartite with a switch-on operation element which is provided for activating operation of the machine tool and in particular starting a motor. Particularly advantageously, however, the confirmation operation element is embodied by a separate operation element, as a result of which the latter can be designed deliberately in terms of its function, such as in particular with respect to a text, a color and/or size, and conscious perception by an operator can be supported.

If the safety unit is provided to prevent machine tool operation at least for a while, it is possible to achieve advantageously high safety.

In a further configuration of the disclosure it is proposed that the safety unit is provided for releasing machine tool operation depending on at least one confirmation signal, in particular initiated by the confirmation operation element. With a corresponding configuration, it is possible to permit an operator increased operational flexibility.

If the safety unit is provided for releasing machine tool operation depending on at least one parameter which differs from the confirmation signal, it is possible to advantageously support specific signals being consciously perceived by an operator. Particularly advantageously, the differing parameter is formed by a time parameter, that is to say that in particular only after a specific time period the machine tool operation can be released using the confirmation signal, preferably after a time period of greater than half a second and less than three seconds. In particular, it is possible using a corresponding configuration to prevent the simultaneous actuation of a switch-on actuation element and a confirmation operation element for releasing the machine tool operation.

If the safety unit has detected that the function of the monitoring unit is restricted, such as for example if a protection hood is opened and/or an operator wears gloves and it is therefore difficult to distinguish a hand of an operator from an object to be processed, it is possible to still allow the monitoring unit to be active in order to ensure admittedly to a limited extent, however at least partially, a monitoring function. Furthermore it is possible to reset or deactivate the monitoring unit. In the case of resetting, depending on the captured parameter, it is possible to reset using the safety unit parameters which are different and appear to be sensible to a person skilled in the art, for example it is possible for other sensor units to be activated and/or sensor units provided for conventional application, for example with closed protection hood and/or operation without gloves can be adjusted. It is possible in particular after resetting and before resetting to additionally or alternatively also monitor other regions.

The machine tool monitoring unit can be used in different machine tools which appear to be sensible to a person skilled in the art, however particularly advantageously in the case of circular saws.

BRIEF DESCRIPTION OF THE DRAWINGS

Further advantages emerge from the following description of the drawing. The drawing illustrates an exemplary embodiment of the disclosure. The drawings, the description and the claims contain numerous features in combination. A person skilled in the art will also expediently consider the features individually and combine them to form meaningful other combinations.

In the figures.

DETAILED DESCRIPTION

Figure 1:
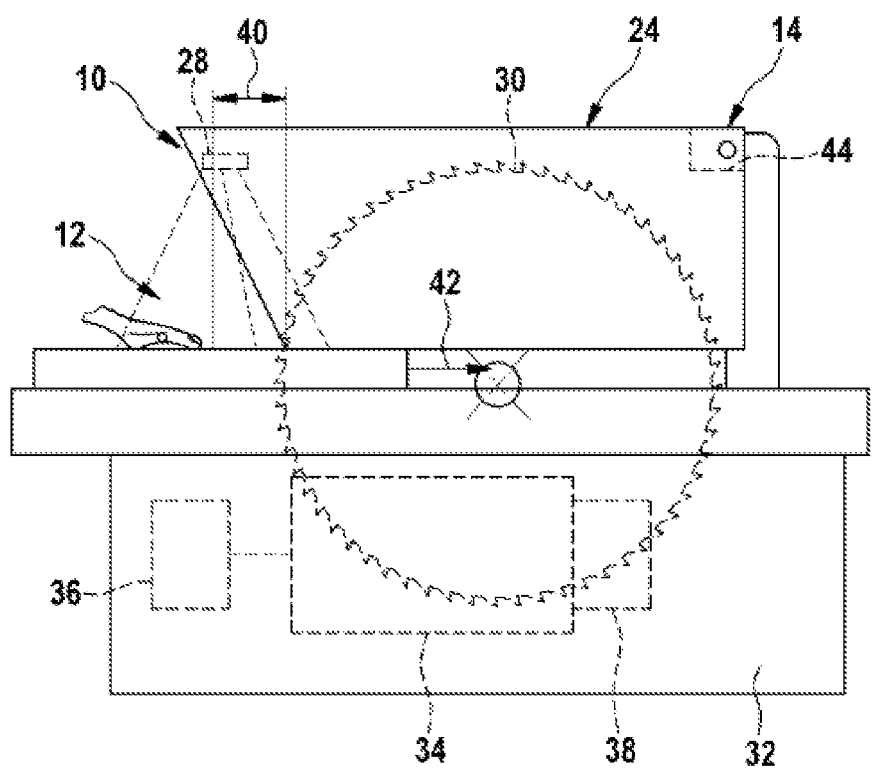
FIG. 1 shows a schematic of a machine tool formed by a circular saw in side view.

FIG. 1 shows a schematic of a machine tool formed by a circular saw in a side view. The machine tool has a disk-shaped tool formed by a saw blade 30, which tool is driven in a rotary manner during sawing operation using a drive unit 34 which is arranged in a drive housing 32 and is configured as an electric motor.

The machine tool has a machine tool monitoring device having a monitoring unit 10, which is provided for detecting the presence of a material type, specifically of human tissue, in a machine tool working region 12 using spectral evaluation of radiation. The monitoring unit 10 has an evaluation unit 36 and a sensor unit 28 which is arranged in the front region of a protection hood 24 of the machine tool and has a sensitivity region for capturing radiation in a wavelength range which is situated partially in the infrared spectrum. The evaluation unit 36 has a computation unit (not illustrated in more detail), a memory unit and an operating program stored in the memory unit. The monitoring unit 10 has a reaction region 40 which is associated with an actuator unit 38 which is coupled to the drive unit 34 and is in operative connection with the monitoring unit 10. If the monitoring unit 10 detects the presence of human tissue in the reaction region 40, an actuation signal is transferred to the actuator unit 38 which stops the drive unit 34 on the basis of this actuation signal. The reaction region 40 corresponds substantially to the machine tool working region 12, which is arranged in a working direction 42 upstream of the saw blade 30.

Figure 2:
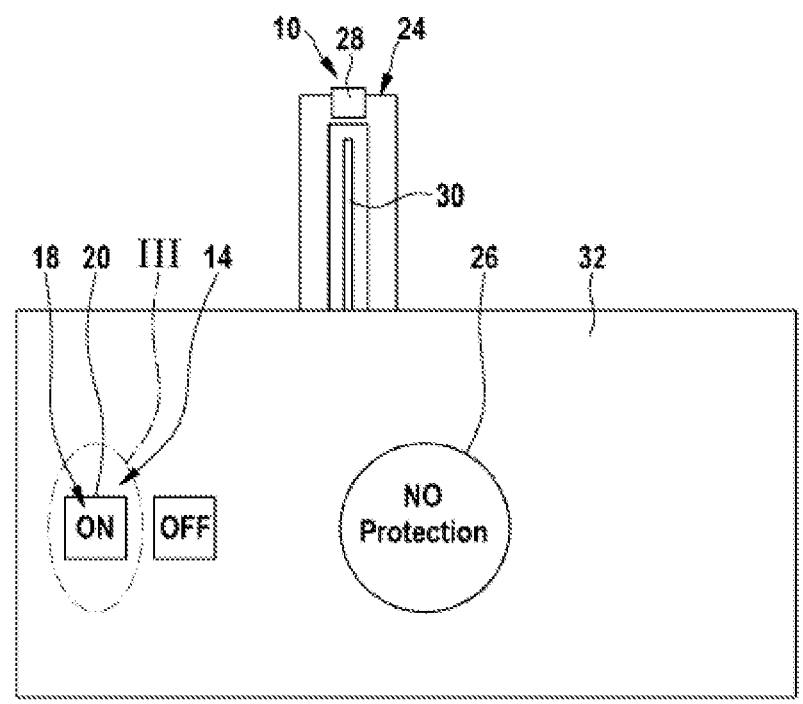
FIG. 2 shows a schematic of a front view of the machine tool from FIG. 1.
Figure 3:
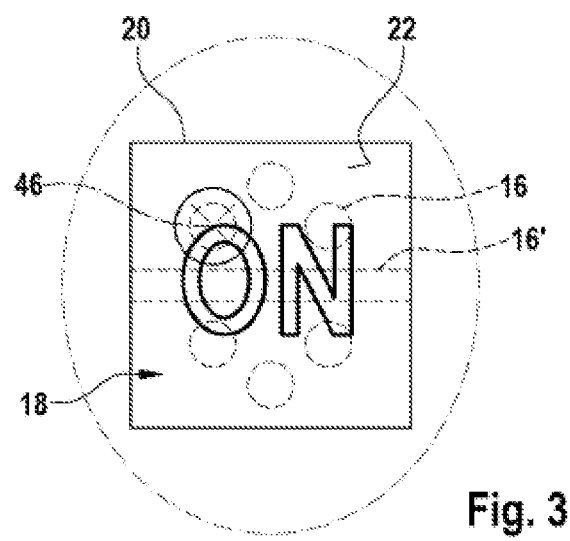
FIG. 3 shows an enlarged detail III from FIG. 2

The machine tool monitoring device has a safety unit 14 which is provided for outputting safety status signals depending on parameters. The safety unit 14 has a sensor unit 16 which is provided for monitoring an actuation region 18 of an actuation element 20, specifically an actuation region 18 of a switch-on actuation element (FIGS. 2 and 3). The switch-on actuation element serves for starting the machine tool, specifically in particular for starting the drive unit 34. The switch-on actuation element is formed by a pressure switch. The sensor unit 16 is provided for detecting the presence of a material type, specifically for detecting the presence of human tissue. Alternatively and/or additionally, a sensor unit 16' could also be provided, which is provided for life detection and/or for detecting a fingerprint, as is shown schematically in FIG. 3. The sensor unit 16 is arranged directly under an actuation surface area 22 of the actuation element 20. A straight line 46, which extends perpendicular to the actuation surface area 22 and parallel to an actuation direction of the actuation element 20, intersects the sensor unit 16. A wall of the actuation element 20, which forms the actuation surface area 22, is designed with respect to its optical properties such that it is nearly transparent in wavelength ranges to be examined, that is to say has in particular an absorptance and reflectance in each case of below 20%.

The sensor unit 16 has a transmission unit and a receiving unit. The transmission unit comprises a plurality of transmission means formed by LEDs. The receiving unit comprises two receiving means formed by photodiodes, which have different sensitivity regions, with the sensitivity regions partially overlapping. The safety unit 14 has an evaluation unit which is provided for concluding the presence of human tissue using a spectral evaluation of radiation. The evaluation unit is configured to be unipartite with the evaluation unit 36 of the monitoring unit 10. It is possible using the sensor unit 16 and the evaluation unit 36 to detect whether an operator actuates the switch-on actuation element with or without gloves.

In addition, the safety unit 14 is provided for considering a parameter of the protection hood 24. The safety unit 14 has for this purpose in a bearing region of the protection hood 24 a sensor unit 44 which is provided for capturing a pivot angle and a presence of the protection hood 24. Proceeding from the pivot angle, a conclusion is drawn in the evaluation unit of the safety unit 14 as to whether the protection hood 24 is in a proper protection position or is pivoted upwardly so far that protection is significantly adversely affected and in particular an access region to the saw blade 30 is produced which is outside a monitoring region of the monitoring unit 10.

Furthermore, the safety unit 14 has a confirmation operation element 26 (FIG. 2). The confirmation operation element 26 is configured to be separate from the actuation element 20 and is formed by a pressure button which is characterized and illuminated with an alerting color, such as in particular red.

The machine tool is configured in a manner such that automatic switch-off occurs after each work process, that is to say, if it is detected that a sawing process of an object was carried out, the drive unit 34 is stopped.

Because of this, frequent operation of the switch-on actuation element is necessary, which leads to an advantageously frequent examination possibility by the sensor unit 16.

Figure 4:
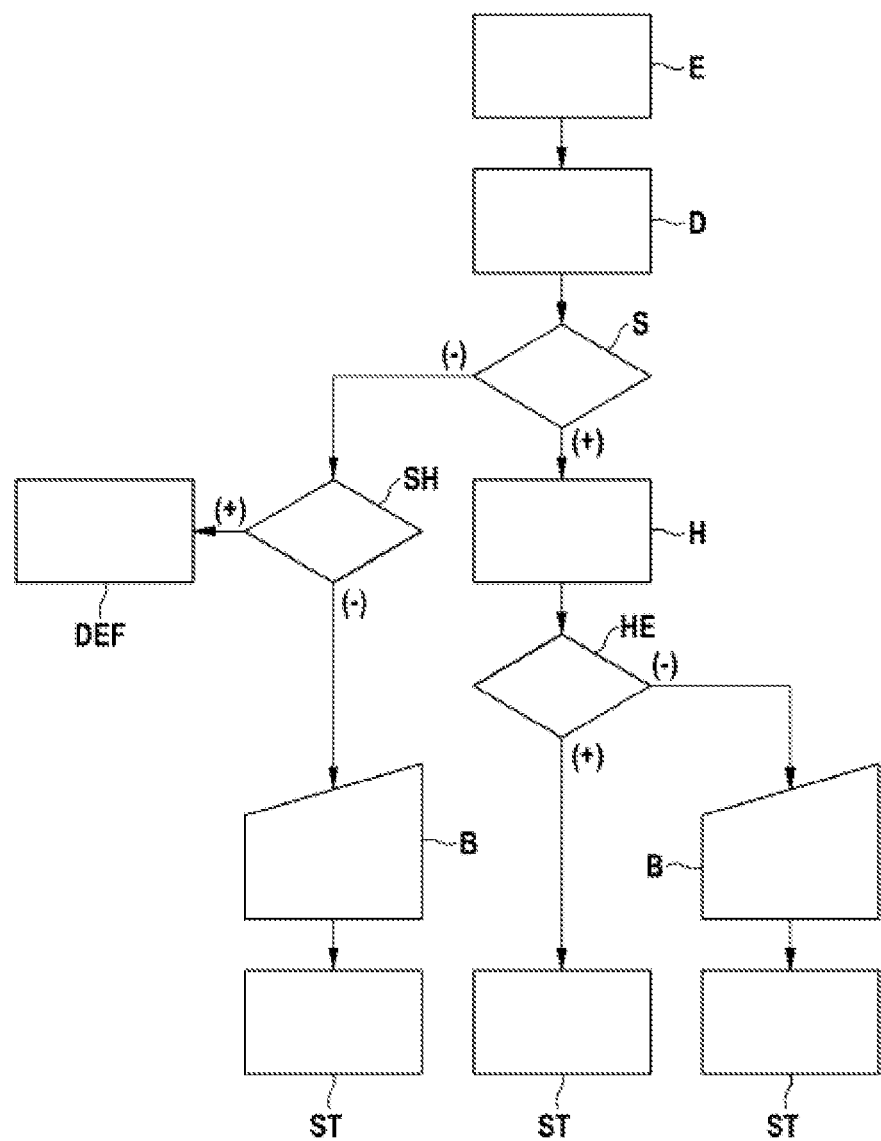
FIG. 4 shows a flow chart over an operational sequence of the machine tool.

FIG. 4 shows a flowchart of a sequence of the machine tool. If actuation E of the actuation element 20 is present, a diagnostic D is started using the safety unit 14. In a first step, the safety unit 14 carries out a machine-side status check S which relates in particular to the sensor unit 28 and the evaluation unit 36. If, during a machine-side status check S, a negative status is determined by the safety unit 14, in a next examination SH the parameter of the protection hood 24 is evaluated. If the protection hood 24 is in a proper position, a defect DEF in the monitoring unit 10 is concluded. In the machine tool different settings which can be selected by an operator are possible as to how operation can proceed after a defect DEF has been detected. In a first setting, machine tool operation is prevented by the safety unit 14, wherein the machine tool operation is released by a confirmation signal triggered using actuation of the confirmation operation element 26. In a second setting, it is possible only after a specific time period after actuation of the actuation element 20 to release the machine tool operation by actuation of the confirmation operation element 26. The time period is one second. In principle, other time periods are also conceivable. It is possible in particular to reliably avoid thus that, with a detected defect, an operator can achieve release simply by simultaneously actuating the actuation element 20 and the confirmation operation element 26. In a third setting, machine tool operation is permanently prevented. Instead of the different settings, it is also conceivable that the machine tool has only one fixed setting which can correspond to one of the three different settings.

If in the examination SH it is detected that the protection hood 24 is removed or not arranged in a proper position, machine tool operation is prevented by the safety unit 14, wherein the machine tool operation can be released by a confirmation signal triggered by way of an actuation B of the confirmation operation element 26. The drive unit 34 starts ST. It is thus possible to advantageously also carry out uses without protection hood 24, such as in particular cutting of grooves, and the operator is expressly made aware of the deactivated monitoring unit 10 and has also confirmed this.

If a positive status is determined in the status check S, a skin detection check H is activated, and in a check HE the parameters captured by the sensor unit 16 are evaluated. If a positive check result is present in the check HE, that is to say, if in the check HE a presence of skin is concluded, the drive unit 34 is started ST. If a negative check result is present in the check HE, that is to say no presence of skin can be concluded, machine tool operation is prevented by the safety unit 14, wherein the machine tool operation can be released by a confirmation signal triggered by way of an actuation B of the confirmation operation element 26. The drive unit 34 starts ST.

If the machine tool operation is prevented by the safety unit 14, the safety unit 14 outputs an acoustic and optical signal which makes the operator aware that an actuation of the confirmation operation element 26 is necessary in order to start the drive unit 34. Furthermore, the safety unit 14 signals to an operator that operation with an at least restricted monitoring function is present, and specifically an illumination which optically characterizes the reaction region 40 is deactivated.

The invention claimed is:

1. A machine tool monitoring device comprising:
   a monitoring unit configured to monitor a machine tool working region of a machine tool, the monitoring unit being further configured to detect the presence of a material type in the machine tool working region;
   at least one actuation element defining an actuation region; and
   a safety unit including at least one sensor unit configured (i) to detect a presence of the material type in the at least one actuation region, and (ii) to detect an absence of the material type in the at least one actuation region,
   wherein the safety unit configures the at least one actuation element for actuation of a motor of the machine tool in response to the detection of the presence of the material type in the at least one actuation region, and wherein the safety unit is configured to prevent actuation of the motor with the at least one actuation element in response to the detection of the absence of the material type in the at least one actuation region.

2. The machine tool monitoring device as claimed in claim 1, wherein the sensor unit is configured to monitor an actuation region of a switch actuation element.

3. The machine tool monitoring device as claimed in claim 1, wherein the sensor unit is further configured for life detection of an element positioned in the at least one actuation region and/or for detecting at least one fingerprint positioned in the at least one actuation region.

4. The machine tool monitoring device as claimed in claim 1, wherein the sensor unit is arranged at least partially directly under an actuation surface area of the actuation element.

5. The machine tool monitoring device as claimed in claim 1, wherein the safety unit is configured to consider at least one parameter of a protection hood.

6. The machine tool monitoring device as claimed in claim 1, wherein:
   the safety unit further includes at least one confirmation operation element configured to generate at least one confirmation signal, and
   the safety unit configures the at least one actuation element for actuation of the motor of the machine tool in response to (i) the detection of the absence of the material type in the at least one actuation region, and (ii) the generation of the at least one confirmation signal.

7. The machine tool monitoring device as claimed in claim 1, wherein the safety unit is configured to prevent operation of the motor at least for a while.

8. The machine tool monitoring device as claimed in claim 6, wherein the safety unit configures the at least one actuation element for actuation of a motor of the machine tool in response to at least one parameter which differs from the confirmation signal.

9. A machine tool comprising:
   a motor;
   at least one actuation element associated with the motor and defining an actuation region;
   a machine tool monitoring device including (i) a monitoring unit configured to monitor a machine tool working region of the machine tool and further configured to detect a presence of a material type in the machine tool working region, and (ii) a safety unit including at least one sensor unit configured to detect a presence of the material type in the at least one actuation region, and to detect an absence of the material type in the at least one actuation region,
   wherein the safety unit configures the at least one actuation element for actuation of the motor in response to the detection of the presence of the material type in the at least one actuation region, and
   wherein the safety unit is configured to prevent actuation of the motor with the at least one actuation element in response to the detection of the absence of the material type in the at least one actuation region.

10. A method of operating a machine tool including a motor, at least one actuation element, and a machine tool monitoring device having a monitoring unit and a safety unit, comprising:
   monitoring a machine tool working region of the machine tool with the monitoring unit;
   detecting a presence of a material type in the machine tool working region with the monitoring region;
   detecting a presence of the material type in an actuation region of the at least on actuation element; and
   configuring the at least one actuation element for actuation of the motor in response to the detection of the presence of the material type in the actuation region.

11. The method of claim 10, further comprising:
   stopping actuation of the motor in response to the detection of the presence of the material type in the machine tool working region.

12. The method of claim 10, wherein the material type is human tissue.

13. The method of claim 1, wherein the material type is human tissue.

14. The method of claim 9, wherein the material type is human tissue.

* * * * *